United States Patent Office 2,991,230
Patented July 4, 1961

2,991,230
OXYGENATION OF STEROIDS WITH
STREPTOMYCES HALSTEDII
Donald A. Kita, Jackson Heights, N.Y., assignor to Chas.
Pfizer & Co., Inc., New York, N.Y., a corporation
of Delaware
No Drawing. Filed June 24, 1959, Ser. No. 822,451
5 Claims. (Cl. 195—51)

This invention relates to a new and useful process for the oxygenation of steroids. More particularly, the present invention is concerned with the 16α-hydroxylation of various selected steroid substrates by microbiological means.

Although the microbiological transformation of steroids has been extensively studied in the past [Trans. N.Y. Acad. Sc., Ser. II, vol. 19, No. 2, pp. 147–172 (1956)], the introduction of an oxygen atom at the 16α-position of the molecule is fraught with many difficulties. As can be well understood by those skilled in the art, any process concerned with the 16α-hydroxylation of steroids is of tremendous value both to the public in general and to the pharmaceutical industry in particular. For instance, various 16α-hydroxycorticosteroids, such as 6α-chloro-9α-fluoro-16α-hydroxyhydrocortisone-16,17-acetonide 21-acetate and its corresponding 1-dehydro derivative, exhibit anti-inflammatory potencies ranging up to approximately 200 times that of hydrocortisone and at the same time are devoid of any deleterious side effects. As a matter of fact, they either exhibit sodium excretion patterns to a significant degree or they at least show a marked decrease in the amount of sodium retention. Moreover, there is no known instance reported in the literature concerning the 16α-hydroxylation of such female sex hormones as estrone and estradiol by microbiological means.

Accordingly, it is a primary object of the present invention to provide a process for the 16α-hydroxylation of steroids by a microbiological means. Another object of the invention is to provide a process for the 16α-hydroxylation of steroids which will be extremely efficient to operate and highly economical to conduct. Other objects and advantages of the invention will become apparent to those skilled in this art from the description which follows.

In accordance with the present invention, it has now been unexpectedly discovered that the microbiological 16α-hydroxylation of various selected steroid substrates can be carried out by the use of certain microorganisms belonging to the species Streptomyces halstedii. As a matter of fact, this invention represents the first known instance of the 16α-hydroxylation of such female sex hormones as estrone and estradiol by microbiological means as previously indicated. In general, the steroids employed must all possess from 18 to 21 carbon atoms in their skeletal structure and have a methylene group in the 16-position of the ring nucleus. It is to be understood that for the production of the hydroxysteroids of the present invention, this process is not necessarily limited to the aforesaid microorganisms or to microorganisms fully answering their description as they are only presented for purposes of illustration. As a matter of fact, it is especially intended to include the use of mutants produced from such microorganisms by various means, such as X-radiation, ultrasonic vibrations, nitrogen mustards, transduction, transformation, and the like. Furthermore, there is also included within the scope of this invention any mutants or forms of S. halstedii that are developed by such techniques as those described by L. S. Olive [American Journal of Botany, vol. 43, issue No. 2, pp. 97–106 (1956)] and G. Pontecorvo [Advances in Genetics, vol. 5, pp. 141–238 (1953)]. Incidentally, the microorganisms employed in the process of this invention are all extremely simple to grow and they can easily be adapted to large scale commercial operations. In the latter connection, the facility with which these organisms readily grow on very cheap media is particularly advantageous. In general, the present process affords good yields of the desired products, which can be isolated with ease and readily purified.

In accordance with the process of this invention, an aqueous nutrient medium containing a steroid substrate of the general type previously referred to is fermented under submerged aerobic conditions with a particular S. halstedii microorganism as aforesaid. Preferred steroid substrates in this connection include such corticosteroids as desoxycorticosterone, corticosterone, 17α-hydroxycorticosterone and the 9β-hydroxy derivative thereof, 9α-fluoro-17α-hydroxycorticosterone, prednisolene, 2-methyl prednisolone, 9α-fluoroprednisolone and the 6-dehydro derivative thereof, as well as such steroid hormones as pregnenolone, progesterone, 11β, 14α, 17α-trihydroxyprogesterone, testosterone, 19-nortestosterone, estrone and estradiol, the latter two compounds undergoing this microbiological reaction for the first time as aforesaid. Cultures of these miscroorganisms are available in several public culture collections such as that of the Northern Utilization Research and Development Division of the U.S. Department of Agriculture at Peoria, Illinois (Streptomyces halstedii NRRL B–1238), while others may be isolated from natural materials such as the soil by standard procedures well known to mycologists [Streptomyces halstedii ATCC 13,499 (Waksman and Curtis) Waksman and Henrici]. It should also be realized that the yield of 16α-hydroxylated derivative produced by this process will vary to some extent, depending on the nature of the steroid substrate as well as on the particular microorganism employed in addition to such other reaction variables and conditions as time, temperature, pH, composition of the aqueous nutrient medium and the point at which the substrate is added to the whole fermentation broth, etc. Incidentally, various well known methods may be conveniently used for the isolation and identification of the products so obtained.

In carrying out the process of this invention, it has been found desirable to employ cultures which are grown in or on media favorable to their development. In this connection, it is to be noted that although solid media may be utilized, liquid media are preferred for mycelial growth under aerobic conditions. For instance, such liquid media as Brewer's wort are well adapted to use under submerged aerobic fermentation conditions. For these purposes, it is necessary that the media contain suitable sources of available carbon, nitrogen and minerals so as to facilitate substantial growth of the microorganism under optimum conditions. Available carbon may be obtained from such sources as corn meal, proteins, amino acids, carbohydrates, starches, dextrin, molasses and sugars, including glucose, fructose, mannose, galactose, maltose, sucrose, lactose, various pentoses and cerelose, while carbon dioxide, glycerol, alcohols, acetic acid, sodium acetate, etc., are illustrative of other materials which provide assimilable carbon for the energy requirements of these microorganisms; in this regard, mixtures of various carbon sources are often employed to advantage. Nitrogen may be provided in assimilable form from such suitable sources as soluble or insoluble animal and vegetable proteins, soybean meal, peanut meal, wheat gluten, cottonseed meal, lactalbumin, casein, egg albumin, peptones, polypeptides or amino acids, urea, ammonium salts and sodium or potassium nitrate; furthermore, whey, distillers solubles, corn steep liquor and yeast extract have also been found to be useful. Among the various mineral constituents which the media may contain, either naturally present or added, are available calcium, magnesium, potassium and sodium, as well as trace amounts of chromium, cobalt, copper, iron and zinc; sulfur may be provided by means of sulfates, free sulfur, hyposulfite, persulfate, thiosulfate, methionine, cysteine, cystine, thiamine and biotin, while phosphorus can be provided from such sources as ortho-, meta-, or pyrophosphates, salts or esters thereof, glycerophosphate, corn steep liquor and casein. Incidentally, if excessive foaming is encountered during the fermentation step, anti-foaming agents such as vegetable oils may be added to the fermentation medium. In addition, suspending agents or mycelial carriers, such as filter earths, filter aids, finely divided cellulose, woodchips, bentonite, calcium carbonate, magnesium carbonate, charcoal, activated carbon or other suspendable solid matter, methylcellulose or carboxymethylcellulose, alginates, and the like, may also be added to the reaction mixture in order to facilitate such unit processes and operations as fermentation, aeration, filtration, and the like.

In accordance with a more specific embodiment of the process of this invention, the cultivation of microorganisms selected from the aforementioned species is generally conducted in an aqueous nutrient medium at a temperature that is in the range of from about 20° C. to about 35° C. under submerged conditions of aeration and agitation, although the preferred temperature range is 24–30° C. The fermentation is generally continued until substantial growth is achieved and a period of about one to about four days is usually sufficient for such purposes. The pH of the fermentation medium tends to remain rather constant, generally being in the range of from about pH 5.5 to about pH 8.0 and in most cases it remains in the pH range of approximately 6–7. However, in order to prevent variations that may occur in this respect as well as to maintain the pH of the medium in the preferred range of pH 6.4–6.8, buffering agents such as calcium carbonate may be added to the medium.

In connection with the fermentation step, it is to be noted that suitable inocula for the growth of the aforementioned microorganisms and the subsequent or concurrently occurring microbiological transformation may be obtained by employing culture slants propagated on media such as beef lactose, potato-dextrose agar or Emerson's agar. The slant washings so obtained may then be used to inoculate either shaken flasks or inoculum tanks for submerged growth or alternatively, the inoculum tanks may be seeded from the shaken flasks. The growth of the microorganism usually reaches a maximum in about two or three days, although variations in the equipment used as well as in the rates of agitation and aeration, and so forth, may affect the speed with which maximum growth is achieved. In particular, the growth rate during the fermentation stage is especially dependent upon the degree of aeration employed, the latter being effected by either surface-culture aerobic fermentation conditions or, and preferably, by submerged aerobic conditions as aforesaid. The latter operation is usually accomplished by blowing air through the fermentation medium which is simultaneously subjected to constant agitation. In general, a desirable rate of aeration for the medium is from about one-half to about two volumes of free air per volume of broth per minute, although resort may be had to such modifications as the use of subatmospheric or superatmospheric pressure; for instance, pressures of 10 lbs./sq. in. and 30 lbs./sq. in., respectively, may be employed. Incidentally, constant agitation can be conveniently achieved by the use of suitable types of agitators or stirring apparatus generally familiar to those in the fermentation industry. Needless to say, aseptic conditions must be maintained throughout the transfer of the inoculum and throughout the period of growth of the microorganism.

The steroid compound as a solid, or in a solution or suspension with a suitable solvent such as acetone or ethanol or mixtures thereof, is added to the cultivated microorganism under aseptic conditions, and the resulting medium is then agitated and aerated in order to bring about the growth of the microorganism and the concurrent or subsequent transformation of the steroid substrate as the case may be. In the latter connection, it is to be noted that the steroid substrate may either be added when the medium is seeded with a culture of the desired microorganism or after growth of the selected organism has been established in the nutrient medium under aerobic conditions. In some instances, it may be found more advisable to follow the latter procedure, particularly if there is a tendency to produce undesired by-products from the steroid substrate during the initial stages of growth of the microorganism. Another method which is most useful is one in which the microorganism is grown on a suitable nutrient medium under aerobic conditions in the absence of a steroid; the mycelial growth obtained in this manner may then be filtered from the broth, washed with distilled water and added to an aqueous suspension of the steroid substrate followed by agitation and aeration of the mixture for about 12 to about 48 hours, after which time the product of the reaction is isolated. This process has the advantage of ease of recovery of the transformation product inasmuch as the various nutrient materials originally used to aid the growth of the microorganism are now absent as are the various materials excreted by the growing organism during the initial stage of growth. Moreover, still other methods such as those familiar to enzyme chemists may also be utilized for conducting the present microbiological transformation process. In all these procedures, it should be kept in mind that the degree of transformation may vary depending upon whether the whole fermentation broth or only the isolated washed mycelium is used.

Enzyme preparations obtained by the growth of a suitable microorganism selected from the aforementioned species may also be used in carrying out the process of this invention. These may be prepared by a variety of methods from the cells of the chosen microorganism, employing several different techniques to release the oxidizing enzymes from the cells. In general, such techniques are familiar to those skilled in the art and they include grinding, particularly with abrasive materials such as powdered glass or sand; autolysis, which involves heating an aqueous suspension of the cells under a layer of toluene at a temperature that is in the range of from about 20° C. to about 35° C. for several days; freeze-drying, which is concerned with the rapid freezing and thawing of the cellular material; ultrasonic vibrations, wherein such energy is employed to rupture the cells; and extraction of the cells with a water-miscible solvent such as acetone. The enzyme preparation so obtained may then be employed for the transformation of the steroids in media similar to those employed in the case of the grown cells, i.e., a medium containing a hydrogen acceptor such as fumarate, a buffer and, in some cases, a bivalent metal, particularly magnesium, together with a minor proportion of adenosine triphosphate. The cell-free enzymes of the microorganism employed in the process of this invention may be used in such media at a temperature that is in the range of from about 20° C. to about 40° C. In general, the transformation of the steroid substrate is effected during a time period ranging from about a few hours to several days. Detailed descriptions of suitable media for both the use of isolated, resuspended cells and of the cell-free elaboration products are given in standard textbooks [e.g., see "Manometric Technique in Tissue Metabolism," by W. W. Umbriet et al., Burgess Publishing Company, Minneapolis (1949), and "Respiratory Enzymes," by H. Lardy, Burgess Publishing Company, Minneapolis (1949)].

In general, a steroid substrate concentration level in the range of from about 0.05% to about 1% by weight of the total weight of the medium is usually employed in conducting this process, although it is possible that other concentration levels may sometimes be found to be more favorable. Inasmuch as the solubility of the steroid starting material is rather limited in water, an excess amount of this substrate may only be slowly converted to the transformation product. However, the state of subdivision of the steroid starting material when added to a growing microorganism or enzyme system does not appear to greatly affect either the yield or the nature of the products form under otherwise identical conditions. For instance, when a solution of the steroid in a water-miscible solvent is added to the aqueous fermentation system, the steroid is generally precipitated in a finely divided form in the presence of a large excess of water. It was found that this did not appreciably improve the rate of transformation as compared with the previously discussed alternate method, involving the direct addition of the steroid susbtrate in anhydrous crystalline form to the whole broth.

After completion of the microbiological transformation step, the product is easily recovered from the mixture by means of extraction with a suitable water-immiscible solvent and preferably with a halogenated lower hydrocarbon solvent or with a water-immiscible lower alkyl ketone or lower alkanol, provided that the pH of the medium is at least below about pH 6.0. Preferred halogenated lower hydrocarbons in this connection include methylene chloride, chloroform, ethylene dichloride, trichloroethane, and the like, chloroform being particularly advantageous in this respect, while preferred water-immiscible lower alkyl ketones and lower alkanols include methyl ethyl ketone, methyl n-propyl ketone, methyl isobutyl ketone, n-butanol, isoamyl alcohol, and the like, with methyl isobutyl ketone being the solvent of choice. The solvent extract containing the product and any unreacted starting material is then concentrated in vacuo to a small volume or else to dryness so as to obtain a solid material. Purification of the so isolated material can then be accomplished in several ways, the most effective method involving the use of chromatography by means of which the product is separated from the unreacted starting material as well as from by-products of unknown structure that may be formed during the course of the transformation. Such chromatographic techniques are readily available and their existence is well known to those skilled in this art [e.g., see A. Zaffaroni et al., Science, vol. 111, p. 6, (1950); R. B. Burton et al., J. Biol. Chem., vol. 188, p. 763 (1951); and I. E. Bush, Biochem J., vol. 50, p. 370 (1952)]. However, an advantage of the present process is that column chromatography is not an absolutely essential step in the recovery and purification of the products afforded by this invention. Accordingly, upon separation or crystallization of the reaction product from the aforementioned concentrate, it is possible to effect purification of the crude crystalline material by means of recrystallization from a suitable solvent such as ethyl acetate or acetone.

This invention is further illustrated by the following examples, which are not to be construed as imposing any limitations on the scope thereof. On the contrary, it is to be clearly understood that resort may be had to various other embodiments, modifications and equivalents thereof without departing from the spirit of the present invention and/or the scope of the appended claims.

*Example I*

Slant washings taken from a culture of a microorganism designated as *Streptomyces halstedii* ATCC 13,499 (isolate identified in the culture collection of Chas. Pfizer & Co., Inc. under the Code No. 49982-22) were inoculated into a sterile nutrient medium having the following composition:

| | Grams |
|---|---|
| Cerelose (dextrose hydrate) | 10 |
| Yeast extract | 5 |
| NZ Amine B (enzymatic digest of casein) | 10 |
| Calcium carbonate | 1 |
| Distilled water in sufficient volume for a 1000 ml. solution. | |

The above inoculated medium was then adjusted to a pH of 6.7 with potassium hydroxide and incubation was subsequently carried out at 28° C. for 48 hours via a rotary shaker. In this way, there were formed a suitable pre-grown inoculum for purposes of seeding a two liter portion of the above described medium contained in a 4-l. fermenting vessel. The fermentation medium had previously been autoclaved at 122° C./20 lbs. per. sq. in. for 60 minutes. After cooling the sterilized medium to room temperature, 5% of the pre-grown inoculum prepared as described above was introduced into the medium with constant agitation being maintained throughout this step. The fermentation was then conducted at 28° C. for 24 hours, employing an aeration rate of one-half volume of air per volume of broth per minute and maintaining a constant agitation rate of 1700 r.p.m.

After completion of a 24 hour growth period, the heavy mycelium so obtained was subsequently removed by passing the whole broth through a filter system consisting of glass wool and gauze. The isolated mycelium was then suspended in two liters of tap water contained in a fermentation pot equipped with a stirring apparatus and to the stirred suspension there was then added 250 mg. of 9α-fluoro-17α-hydroxycorticosterone 21-acetate dissolved in a minimum amount of acetone-ethanol (1:1 by volume). The fermentation was then continued under the same conditions as previously described for a period of 16 hours. At the end of this time, the whole broth was successively extracted with three equivalent volumes of methyl isobutyl ketone. The combined solvent extracts were then concentrated under reduced pressure and subjected to chromatographic assay in the usual manner. It was found that only one major spot could be detected and that this represented approximately a 60% conversion to the corresponding 16α-hydroxylated derivative.

Separation of the desired material was then effected by further evaporation of above concentrate under reduced pressure until almost complete dryness was achieved. The crude crystalline material so isolated was then redissolved in ethyl acetate and subsequently allowed to crystallize from his solution. After one recrystallization from this same solvent, the 9α-fluoro-16α,17α-dihydroxycorticosterone so obtained was found to possess the following characteristic properties: M.P. 235–238° C.; $[\alpha]_D^{25} + 94.5°$ (pyridine).

*Example II*

The same procedure as described in Example I was followed except that the 9α-fluoro-17α-hydroxycorticosterone 21-acetate was initially present in the fermentation medium. The results obtained in this case were substantially the same as those reported in the previous example.

*Example III*

A culture of a microorganism designated as *Streptomyces halstedii* NRRL B-1238 was received from the Northern Utilization Research and Development Division of the U.S. Department of Agriculture at Peoria, Illinois, and used as in Example I. It was found that the conversion of 9α-fluoro-17α-hydroxycorticosterone 21-acetate to the same 16α-hydroxylated derivatives as reported in the first example was accomplished in yields of substantially the same order of magnitude.

*Example IV*

The same procedure as described in Example III is followed except that the 9α-fluoro-17α-hydroxycorticosterone 21-acetate was initially present in the fermentation medium. The results obtained in this case were substantially the same as those reported in the previous example.

*Example V*

The procedure described in Example I was followed except for the fact that 17α-hydrocorticosterone was employed as the substrate in lieu of its 9α-fluoro derivative with substantially the same results being obtained. Other steroid substrates such as 9β,17α-dihydroxycorticosterone, desoxycorticosterone, corticosterone, prednisolone, 2-methylprednisolone 9α-fluoro-prednisolone and the 6-dehydro derivative thereof, pregnenolone, progesterone, 11β,14α,17α-trihydroxyprogesterone, testosterone, 19-nortestosterone, estrone and estradiol were each individually subjected to this same procedure. In every case, the 16α-hydroxylated derivative corresponding to the 21-alcohol of the respective steroid substrate was the product obtained.

*Example VI*

The procedure of Example I was followed except that the 21-propionate of 9α-fluoro-17α-hydroxycorticosterone was the substrate employed in lieu of the 21-acetate. In the same maner, the corresponding 21-butyrate, 21-valerate, 21-phenylacetate, 21-benzoate and 21-thenoate were each individually subjected to this same procdure. In every case, the same 16α-hydroxylated derivative as reported in the first example was the product obtained.

What is claimed is:

1. A process for the 16α-hydroxylation of a steroid compound having from 18 to 21 carbon atoms in the skeleton structure and a methylene group in the 16-position of the ring nucleus, which comprises subjecting said steroid compound to the action of oxygenating enzymes of a microorganism selected from the group consisting of *Streptomyces halstedii* ATCC 13,499 and *Streptomyces halstedii* NRRL B-1238.

2. A process as claimed in claim 1 wherein the steroid compound is subjected to the action of a growing culture of the microorganism.

3. A process as claimed in claim 1 wherein the microorganism is cultivated in an aqueous nutrient medium under submerged aerobic conditions until substantial growth is obtained and the steroid compound is then added to the fermentation mixture.

4. A process for the 16α-hydroxylation of a steroid compound having from 18 to 21 carbon atoms in the skeleton structure and a methylene group in the 16-position of the ring nucleus, which comprises cultivating a microorganism selected from the group consisting of *Streptomyces halstedii* ATCC 13,499 and *Streptomyces halstedii* NRRL B-1238 in an aqueous nutrient medium under submerged aerobic conditions in the presence of said steroid substrate at a temperature that is in the range of from about 20° C. to about 35° C. for a period of about one to about four days.

5. A process as claimed in claim 4 wherein the 16α-hydroxysteroid so produced is recovered from the fermentation broth.

References Cited in the file of this patent

UNITED STATES PATENTS

| | | |
|---|---|---|
| 2,709,705 | Perlman et al. | May 31, 1955 |
| 2,855,343 | Fried et al. | Oct. 7, 1958 |
| 2,864,836 | Lincoln et al. | Dec. 16, 1958 |